US008948898B2

(12) United States Patent
Barkmann et al.

(10) Patent No.: US 8,948,898 B2
(45) Date of Patent: Feb. 3, 2015

(54) METHOD FOR OPERATING A GLUING SYSTEM

(75) Inventors: Ralf Barkmann, Hamburg (DE); Wolfgang Rohwedder, Hamburg (DE); Marc-Daniel Stegen, Hamburg (DE)

(73) Assignee: Focke & Co. (GmbH & Co. KG), Verden (DE)

( * ) Notice: Subject to any disclaimer, the term of this patent is extended or adjusted under 35 U.S.C. 154(b) by 505 days.

(21) Appl. No.: 13/377,699

(22) PCT Filed: May 26, 2010

(86) PCT No.: PCT/EP2010/003185
§ 371 (c)(1),
(2), (4) Date: Dec. 12, 2011

(87) PCT Pub. No.: WO2010/145748
PCT Pub. Date: Dec. 23, 2010

(65) Prior Publication Data

US 2012/0095588 A1 Apr. 19, 2012

(30) Foreign Application Priority Data

Jun. 18, 2009 (DE) ......................... 10 2009 029 821

(51) Int. Cl.
*G06F 19/00* (2011.01)
*B05C 5/02* (2006.01)
(Continued)

(52) U.S. Cl.
CPC ........... *B05C 5/0279* (2013.01); *B05C 11/1007* (2013.01); *B05C 11/1013* (2013.01); *B05C 11/1044* (2013.01); *B31B 1/62* (2013.01);
(Continued)

(58) Field of Classification Search
USPC .................... 700/117, 235; 118/12, 676, 682; 493/151; 165/227; 219/482
See application file for complete search history.

(56) References Cited

U.S. PATENT DOCUMENTS 5,505,215 A * 4/1996 Bencivenni et al. .......... 131/280
6,021,782 A * 2/2000 Seymour et al. .............. 131/280
(Continued)

FOREIGN PATENT DOCUMENTS

DE 19843352 A1 4/1994
DE 19848445 A1 5/2000
(Continued)

OTHER PUBLICATIONS

State Intellectual Property Office of the Poeple's Republic of China, Search Report (on related application No. CN 201080031791.4 (Aug. 30, 2013).

*Primary Examiner* — Kidest Bahta
(74) *Attorney, Agent, or Firm* — Laurence P. Colton; Smith Risley Tempel Santos LLC

(57) ABSTRACT

A method for operating a gluing system (10) for gluing blanks for producing and/or packaging cigarettes or other smokable objects, in which the blanks are conveyed along glue valves (11) of the gluing system (10), in which case, in order to control and/or regulate the glue valves (11), a superordinate master controller (13) respectively transmits values of at least one control and/or regulation parameter to individual controllers (15) which are assigned to the glue valves (11), are subordinate to the master controller (13) and are each connected to the superordinate master controller (13) via a suitable data connection, the subordinate controller (15) using said values to control and/or regulate the glue valve (11) assigned to it.

13 Claims, 3 Drawing Sheets

(51) Int. Cl.
*B05C 11/10* (2006.01)
*B31B 1/62* (2006.01)
*B31B 3/00* (2006.01)

(52) U.S. Cl.
CPC ................. *B31B3/00* (2013.01); *B05C 5/0212* (2013.01); *B05C 11/1028* (2013.01); *B05C 11/1034* (2013.01); *B31B 2201/6017* (2013.01)
USPC ............................ 700/117; 118/676; 165/227

(56) References Cited

U.S. PATENT DOCUMENTS

| | | | | |
|---|---|---|---|---|
| 6,164,753 | A * | 12/2000 | Maza et al. | 347/32 |
| 6,299,931 | B1 * | 10/2001 | Leary et al. | 427/8 |
| 6,342,264 | B1 | 1/2002 | Raterman | |
| 7,470,448 | B2 * | 12/2008 | Janz et al. | 427/207.1 |
| 8,690,744 | B2 * | 4/2014 | Harms et al. | 493/128 |
| 2002/0020419 | A1 * | 2/2002 | Maiwald et al. | 131/69 |
| 2005/0024410 | A1 * | 2/2005 | Subirada et al. | 347/16 |
| 2009/0084773 | A1 * | 4/2009 | Heerdt et al. | 219/482 |

FOREIGN PATENT DOCUMENTS

| | | | |
|---|---|---|---|
| DE | 10021838 | A1 | 11/2001 |
| DE | 10141676 | A1 | 6/2002 |
| DE | 10303285 | A1 | 8/2004 |
| DE | 69825834 | T2 | 9/2005 |
| DE | 102008027259 | A1 | 12/2009 |
| EP | 0884170 | A2 | 12/1998 |
| EP | 1095709 | A2 | 5/2001 |
| WO | 2008100726 | A1 | 8/2008 |
| WO | 2008151804 | A1 | 12/2008 |

* cited by examiner

METHOD FOR OPERATING A GLUING SYSTEM

BACKGROUND OF THE INVENTION

1. Technical Field

The present invention relates to a method for operating a gluing system for gluing blanks for producing and/or packaging cigarettes or other smokable objects, in which the blanks are conveyed along glue valves of the gluing system. The invention also relates to a corresponding gluing system which can be operated using this method.

2. Prior Art

The gluing systems which are used in the cigarette industry and are intended to glue blanks are becoming increasingly complex and sophisticated. For instance, German patent application no. DE 10 2008 027 259 proposes regulating the glue valves on the basis of different operating parameters in such a manner that the sizes of the portions of glue produced on the blanks by the glue valves in each case can be kept at a constant value during the entire period of operation.

Conventional controllers for gluing systems cannot be used or can be used only to a limited extent to implement such a method. In the case of such controllers, a central control device controls all glue valves. For this purpose, unidirectional signal lines run from the central control device to each glue valve according to the number of valves to be controlled. However, return lines from the valves to the controller are not provided. Such controllers are static, relatively slow and inflexible.

BRIEF SUMMARY OF THE INVENTION

On the basis of this prior art, the object of the present invention is to specify a method of the type mentioned at the outset for operating a gluing system, which method can also be used to control and/or regulate more complex gluing systems as reliably as possible. The object of the present invention is also to specify a gluing system of the type mentioned at the outset which can be operated using the abovementioned method.

This object is achieved by a method for operating a gluing system for gluing blanks for producing and/or packaging cigarettes or other smokable objects, in which the blanks are conveyed along glue valves of the gluing system (10), characterized in that, in order to control and/or regulate the glue valves, a superordinate master controller respectively transmits values of at least one control and/or regulation parameter to individual controllers which are assigned to the glue valves, are subordinate to the master controller and are each connected to the superordinate master controller via a suitable data connection, the subordinate controller using said values to control and/or regulate the glue valve assigned to it, and by a corresponding gluing system for gluing blanks for producing and/or packaging cigarettes or other smokable objects, in particular for carrying out the above method, having a plurality of glue valves along which the blanks are conveyable using a conveyor, characterized in that, in order to control and/or regulate the glue valves, the gluing system comprises a superordinate master controller and controllers which are respectively assigned to each glue valve, are subordinate to the master controller and are each connected to the superordinate master controller via a data connection, in particular via a data bus system, values of at least one control and/or regulation parameter being transmittable to the subordinate controllers from the master controller via the data connection, the respective subordinate controller being able to use said values to control or regulate the glue valve assigned to it.

Accordingly, in order to control and/or regulate the glue valves of the gluing system, a superordinate master controller is provided and respectively transmits values of at least one control and/or regulation parameter to individual controllers which are assigned to the glue valves, are subordinate to the master controller and are each connected to the superordinate master controller via a suitable data connection, the respective subordinate controller using said values to control and/or regulate the glue valve assigned to it.

According to the invention, control and/or regulation tasks are divided between at least one superordinate master controller, on the one hand, and subordinate controllers, on the other hand, which are allocated to the individual glue valves. In the solution according to the invention, the respective subordinate controller undertakes, in particular, time-critical control and/or regulation tasks and possibly amplifier functions for amplifying control signals. The parameters used by the subordinate controller to perform control/regulation tasks are managed by the master controller and are possibly calculated using suitable algorithms or are selected from a database which can be accessed by the master controller.

According to the invention, each subordinate controller advantageously controls and/or regulates only one glue valve of the gluing system. The appropriate number of subordinate controllers can thus be used for any number of glue valves intended to be used in the gluing system. In contrast, in the prior art, the control devices have individual control cards each having outputs for a plurality of valves. If fewer or more valves than there are outputs have to be actuated in this case, particular outputs of the control cards accordingly remain unused there in a disadvantageous manner.

Another embodiment of the invention provides for sensors to be respectively connectable to the subordinate controllers and to record measured values of at least one measurement variable, for the subordinate controllers to respectively transmit these measured values to the master controller, and for the master controller to calculate the control and/or regulation parameters for the relevant glue valve connected to the respective controller on the basis of these measured values and/or to select said parameters from a database assigned to the master controller. The calculated and/or selected parameter is then transmitted to the respective subordinate controller.

As the measurement variable to be measured by the sensor connected to the respective controller, it is possible to detect the temperature of the glue supplied to the respective glue valve or of the glue in the respective glue valve. Alternatively or additionally, it is possible to measure the pressure downstream of a feed pump under which the glue is supplied to the respective glue valve. Furthermore, it is possible to detect characteristic variables which characterize movements of a closure element of the glue valve, which closure element moves in the glue inside the respective glue valve.

The corresponding sensor(s) of the glue valves therefore each measure this at least one measurement variable. The respective subordinate controllers then transmit the measured values to the superordinate master controller via their said data connections. This master controller manages the measured values and evaluates them. Depending on the result of the evaluation, the master controller can then respectively transmit new, adapted values of the at least one control and/or regulation parameter to the glue valves, for example. The evaluation can naturally also reveal that the value of the at least one control and/or regulation parameter, which is used by the respective subordinate controller to control and/or regulate the glue valve connected to it, does not have to be adapted. In this case, the corresponding value of the control and/or regulation parameter, which can be accessed by the subordinate controller, is naturally not changed.

A control and/or regulation parameter which can be used by the subordinate controller to control/regulate the respectively connected glue valve may be, for example, the intensity and/or the duration of the electrical current applied to an electromagnet of the respective glue valve, which electromagnet moves a closure element of the respective glue valve in order to open the glue valve during operation of the gluing system. Glue valves having such electromagnets for moving closure elements are described, for example, in German patent application no. DE 10 2008 027 259, the content of which is hereby incorporated in full.

According to another important and independent embodiment, the gluing system has a modular structure. More precisely, the subordinate controllers are each in the form of individual modules which are each connectable to the master controller and/or to at least one further subordinate controller via suitable contact-connection means, in particular via contact plugs and/or contact tongues. The contact-connection means are respectively arranged at the ends of signal lines for transmitting electrical (or possibly electromagnetic) signals, which lines run on or in the individual controllers. The contact-connection means connect these signal lines of the individual controllers to one another. In this case, the signal lines are preferably lines of a suitable data bus system, for instance a CAN bus system. In one particularly preferred embodiment, at least areas of the housing of a first subordinate controller in this case abut the housing of the master controller in the state connecting the signal lines. In a corresponding manner, at least areas of the housing of a second subordinate controller abut the housing of the first subordinate controller in the state connected in this manner, the housing of a third subordinate controller abuts the housing of the second subordinate controller etc.

When a further glue valve is integrated in the gluing system, the gluing system is preferably accordingly expandable by a further subordinate controller for controlling/regulating the added glue valve. This modular structure allows the system to be supplemented with further glue valves in a simple manner or else, conversely, allows one or more glue valves to be removed from the system. After the master controller and the subordinate controllers have been connected via the contact-connection means, the master controller is connected to each individual subordinate controller for data purposes in the manner of a bus system.

BRIEF DESCRIPTION OF THE DRAWINGS

Further advantages of the present invention emerge from the accompanying subclaims, from the following description of a preferred exemplary embodiment and from the accompanying drawings, in which:

DETAILED DESCRIPTION OF PREFERRED EMBODIMENTS

Figure 1:
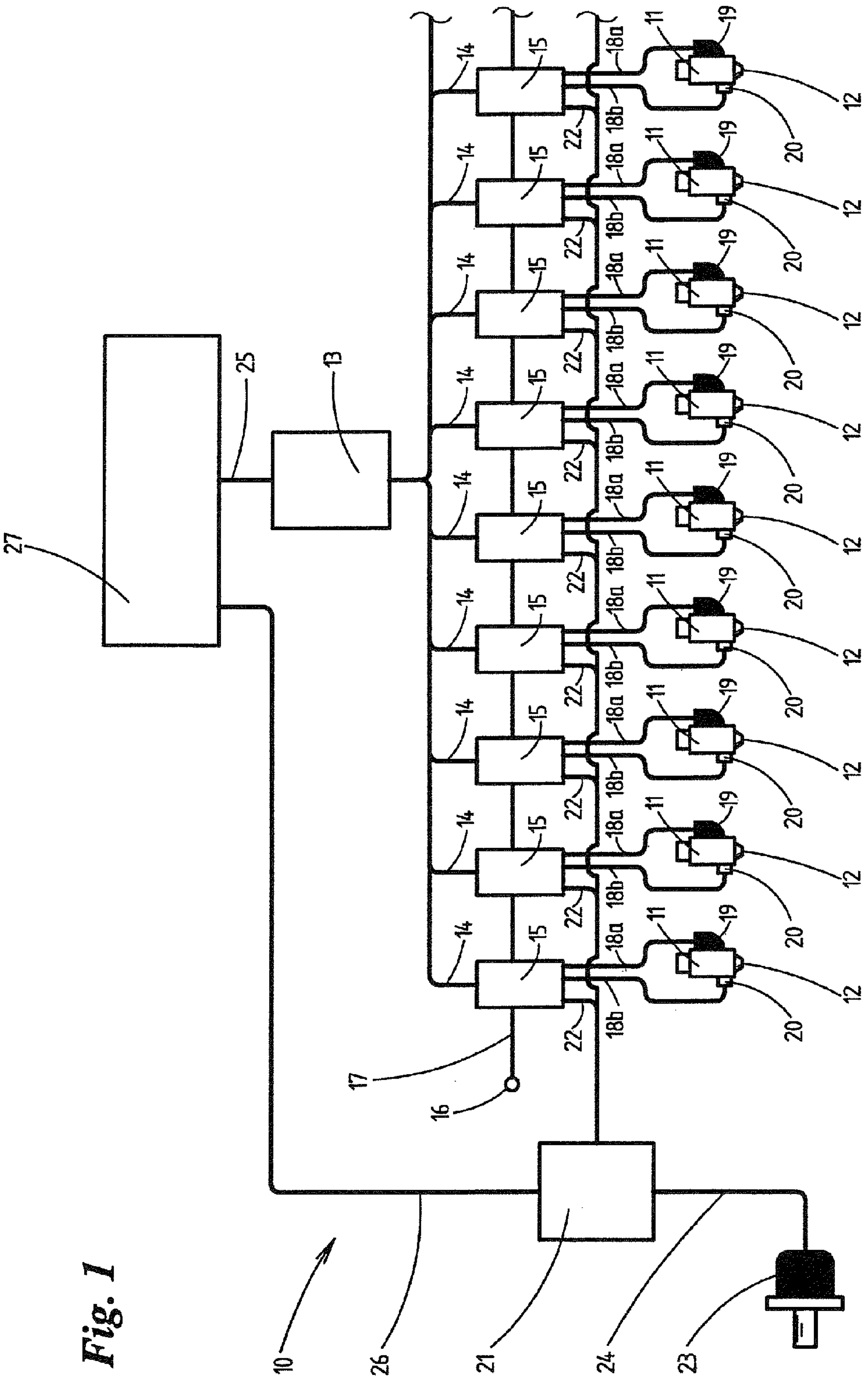
FIG. 1 shows a schematic illustration of the gluing system according to the invention for gluing blanks when producing/packaging cigarettes.

FIG. 1 shows a gluing system 10 which is used in connection with the gluing of blanks for producing and/or packaging cigarettes or other smokable objects. This may be, for example, the production of a cigarette packet of the folding box or hinge-lid type.

The gluing system 10, in particular glue valves 11 of the gluing system 10, is used to provide areas or sections of blanks, from which the corresponding packet is formed, with portions of glue which emerge from the glue valves 11 in a targeted manner. For this purpose, the blanks are conveyed past the glue valves 11 under the latter, namely under closable glue valve openings 12. Details of this are described in German patent application no. DE 10 2008 027 259 to which reference was already made further above.

The gluing system 10 must be operated and controlled/regulated in such a manner that the individual portions of glue are positioned on the blank in desired sizes or amounts and/or in desired patterns at desired times.

In order to suitably control/regulate the gluing system 10, the latter has a master controller 13 to which individual subordinate controllers 15 are connected by means of suitable signal or data lines 14. The data lines 14 are each part of a bus system, a so-called CAN bus system in the present case. This bus system allows bidirectional data communication between the master controller 13 and the individual subordinate controllers 15. The subordinate controllers 15 are connected to a power supply 16 via suitable power lines 17.

An electromagnet having a corresponding coil actuation means 19 is connected to one of the control outputs of the subordinate controllers 15 via a control line 18*a*. The electromagnet is inside the glue valve 11 and is used to move a closure element which is at least partially surrounded by the electromagnet or the coil of the electromagnet. A restoring force holds the closure element inside a valve seat in a manner known per se in the deenergized state of the electromagnet.

Applying an electrical current of suitable intensity to the coil then causes the closure element which can be influenced by the magnetic field of the electromagnet to be moved upward from its closed position counter to the restoring force. This releases the valve opening 12, with the result that glue can emerge from the latter. Details of the structure of such a glue valve can be gathered from German patent application no. DE 10 2008 027 259.

A sensor for detecting a measurement variable relevant to the proper operation of the glue valves 11 is respectively arranged at a further output of the subordinate controllers 15 via a control line 18*b*. In the present case, this is respectively a temperature sensor 20 which extends into the valve interior. The temperature sensor can be used to detect, as the measurement variable, the temperature of the glue inside the glue valve 11 during operation.

A control line 22 which starts from a section controller 21 respectively ends at a further input of the controllers 15.

Signals from a rotary transducer 23 are transmitted to one of the inputs of the section controller 21. The rotary transducer 23 detects rotations of the central machine shaft of a packaging machine (not illustrated) known per se for packaging cigarettes.

For this purpose, the rotary transducer 23 is connected to the section controller 21 using a signal line 24. Both the master controller 13 and the section controller 21 are connected to the central machine controller 27 of the packaging machine via corresponding signal or data lines 25, 26. In the present case, the line 25 which connects the master controller

13 to the machine controller 27 is in the form of an Ethernet connection via which data can be interchanged in a bidirectional manner. The signal line 26 between the section controller 21 and the machine controller 27 is likewise bidirectional in the present case.

The gluing system 10 is controlled/regulated as follows:

The section controller 21 accesses a database assigned to the machine controller 27 via the signal or data line 26. Glue spot patterns are stored in the machine controller 27 or the database on the basis of the blanks used or the packet types to be produced. Depending on the selected glue spot pattern and depending on the machine rotational speed determined using the rotary transducer 23, the section controller 21 transmits corresponding control signals to the subordinate controllers 15.

In other words, times at which the glue valves 11 have to be opened are communicated to or predefined for each of the subordinate controllers 15. The opening operation itself is carried out by applying suitable electrical currents to the respective electromagnets.

For this purpose, each subordinate controller 15 has an amplifier unit which sufficiently amplifies the low control signal currents coming from the section controller 21 in order to be able to effect suitable opening movements of the closure elements of the glue valves with the aid of the electromagnets.

The subordinate controllers 15 control the intensity of the current flowing through the electromagnet during an opening cycle using control/regulation parameters stored in the controllers 15 or in memories or databases assigned to the controllers. These parameters can each be adapted during operation depending on the glue temperatures respectively measured by the sensors 20.

The viscosity of glue is known to be temperature-dependent. The glue in a particular glue valve 11 may thus have such a low viscosity, at a particularly high temperature which differs from predefined desired values, that it becomes necessary to adjust the glue valve 11. In order to detect this situation, the temperature values measured by the respective temperature sensor 20 are first of all each transmitted from the respective controller 15 to the master controller 13. For each glue valve 11, the master controller 13 evaluates the measured temperatures using predefined desired values or using other criteria.

If the evaluation reveals that the glue temperature is too high, the respective glue valve 11 must remain open for a correspondingly shorter time than is the case with a lower glue temperature in order to be able to guarantee overall a predetermined glue portion size despite the high temperature.

The master controller 13 accordingly transmits a suitably adapted control/regulation parameter, which represents the opening duration of the glue valve to be adapted, to the respective subordinate controller 15. The value previously stored for the opening duration in the controller 15 is overwritten. The subordinate controller 15 accordingly adapts the opening time of the glue valve 11 when controlling/regulating the latter.

For example, the intensity of the so-called opening current which flows through the electromagnet and/or the intensity of the so-called holding current can also be adapted in the same manner as the opening duration of the glue valve, depending on the measured temperature values. This has the following background:

When opening the respective glue valve 11, a somewhat higher opening current must first of all flow through the coil of the electromagnet in order to move the closure element upward counter to the restoring force. As soon as the closure element has reached the open end position, only a relatively low holding current is needed to apply the force for holding the closure element in the open position. In the present embodiment, the values for the opening current and the holding current are each likewise stored as parameters in the subordinate controllers 15 and can be dynamically adapted by the master controller 13 in the manner described above on the basis of the measured glue temperature.

The parameters needed to produce a particular packet type or to glue the blanks of this packet type are transmitted, at the beginning of production, from the central machine controller 27 to the master controller 13 via the Ethernet connection 25. The corresponding parameters are stored in suitable databases of the machine controller. The glue spot patterns which can be accessed by the section controller 21 are stored there in the same manner.

Depending on the measured temperatures, the master controller 13 can calculate the new values of the control/regulation parameters, which are to be respectively transmitted to the subordinate controllers 15, by means of suitable algorithms and/or can select them from databases in which, for example, the relevant control and/or regulation parameters are stored on the basis of the glue temperatures.

It is pointed out that each glue valve 11 can naturally be controlled/regulated individually and independently of the other glue valves 11.

Figure 3:
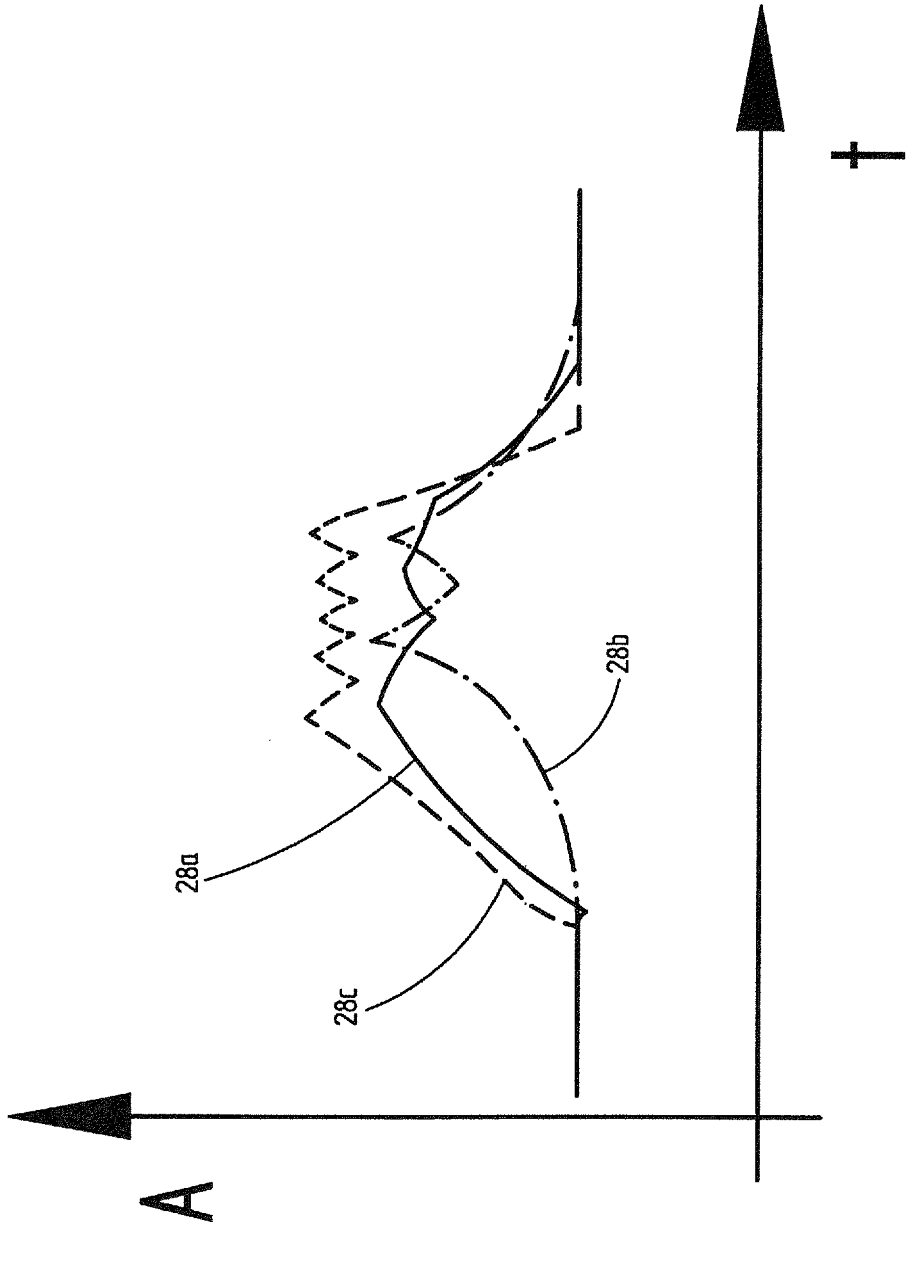
FIG. 3 shows a current/time graph showing the current profiles through the electromagnet of different glue valves which can be integrated in the gluing system.

Another special property of the method according to the invention and of the gluing system 10 according to the invention is explained in connection with FIG. 3. The glue valves 11, namely the electromagnets installed therein, have characteristic current profile curves 28*a*-28*c*. The current flowing through the coil of the electromagnet during operation is detected according to the invention as a characteristic variable.

The current profile of a glue valve suitable for use in the particular gluing system 10 is shown as the curve 28*a*.

The current curve 28*b* shows a profile of a valve which differs from the current curve 28*a*, the specifications of which valve are not suited to the gluing system 10. An electromagnet having specifications which are not suitable can be installed, for example, in the glue valve which is not suitable.

The master controller 13 now respectively compares the actual current values and curves for the respective glue valves with stored desired current curves. When deviations are detected, the master controller 13 recognizes that an unsuitable glue valve of another specification is installed.

The current curve 28*c* represents the current profile of a glue valve which is suitable but is defective. The master controller 13 also recognizes this by corresponding comparison with desired profiles.

Additionally or alternatively, the recorded current profiles can also be evaluated using other predefined criteria in order to detect any faults or differing specifications.

Depending on the result of the analysis of the current profiles, the master controller 13 initiates a signal representing a glue valve fault and/or a signal representing the absence of a predefined feature of the analyzed glue valve. Consequently, an operator can be informed of this by means of an acoustic, optical or other signal.

It is also conceivable for the master controller 13 to select a particular set of control/regulation parameters from a database, depending on the analysis of the current profiles, and to transmit said set to the dependent controllers 15.

Figure 2:
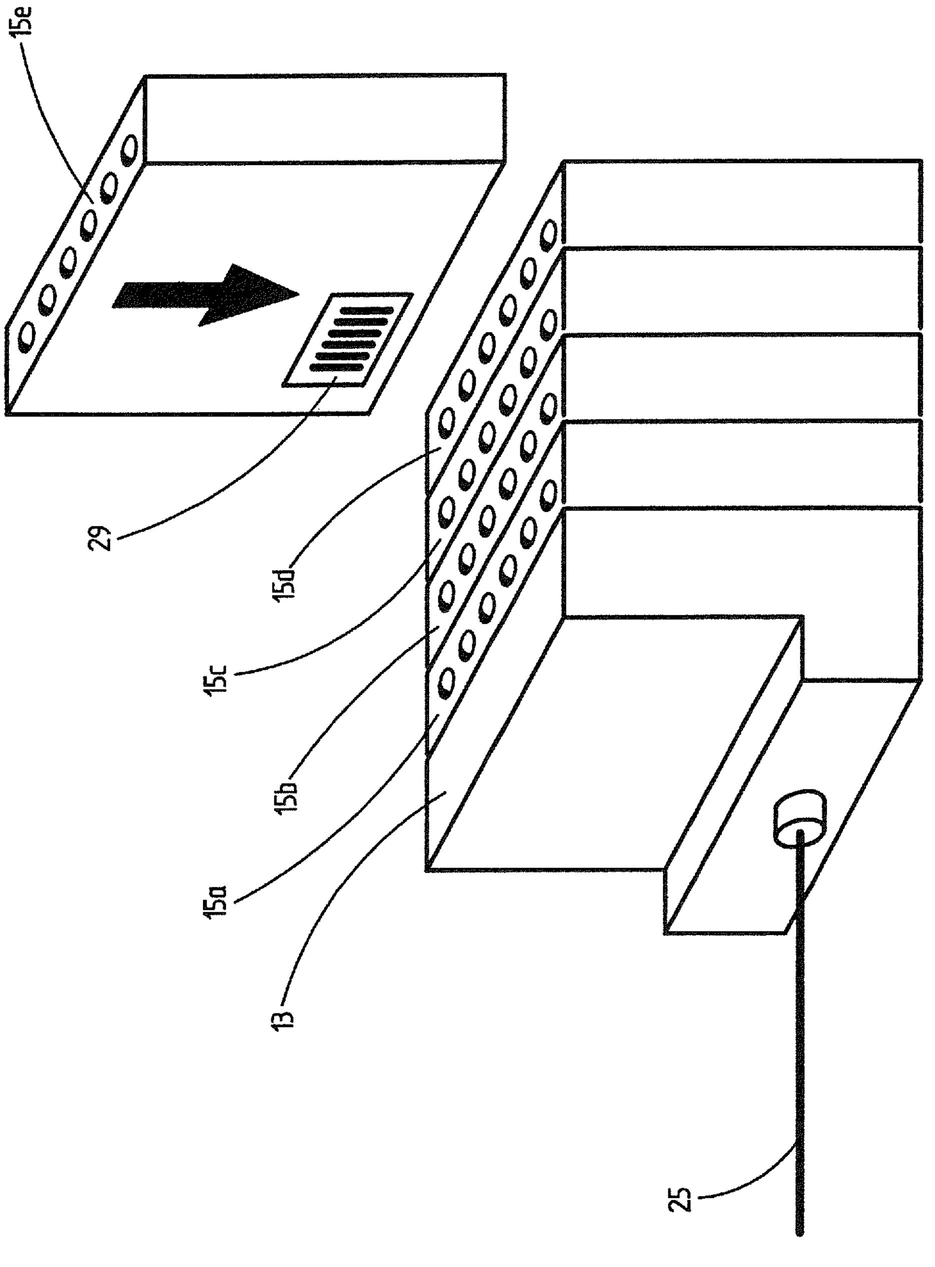
FIG. 2 shows an oblique view of a master controller of the abovementioned gluing system with subordinate controllers plugged onto said system

Another special feature of the invention is the modular structure of the gluing system 10 or of the control/regulating units of the latter. As shown in FIG. 2, the subordinate controllers 15*a-e* are in the form of individual modules which are each connected to the master controller 13 and/or to at least one further subordinate controller 15*a-e* via contact-connection means, namely electrically conductive contact tongues 29.

For this purpose, the master controller 13 and each subordinate controller 15*a-e* each have a corresponding contact tongue 29 on their front and/or rear sides of their respective housings. In this case, based on the individual controllers 13, 15*a-e* in each case, the contact tongues 29 are fitted to ends of corresponding signal lines or data lines which run inside the housings of the controllers 13, 15*a-e*.

When constructing the gluing system 10, a first subordinate controller 15*a* is first of all connected to the master controller 13. For this purpose, the master controller 13 and the first subordinate controller 15*a* are first of all placed side by side and are latched to one another using latching means (not illustrated) in a position aligned with one another. In this latched state, an electrically conductive contact tongue 29 on the rear side of the housing of the master controller 13 and the correspondingly positioned contact tongue 29 of the first subordinate controller 15*a* on the front side of the latter are in contact with one another. A conductive connection 14 between the controllers 13, 15*a* is thus established via the two contact tongues 29 on the respective housing sides of the controllers 13, 15*a*.

The front side of the housing of the second controller 15*b* integrated in the system 10 in turn abuts the rear side of the first subordinate controller 15*a* which already abuts the master controller 13 or is connected to the latter. In this case, their corresponding contact tongues 29 are again connected to one another or are in contact with one another in the manner described above.

Further subordinate controllers 15*c*-15*e* are added to the system 10 in an analogous manner.

The lines in the controllers 13, 15*a-e* are configured and connected to one another in such a manner that they overall form a bus system, namely a so-called CAN bus.

Each controller 15*a-e* controls precisely one glue valve 11. The gluing system 10 can therefore be advantageously expanded in a simple manner. If a further glue valve 11 has to be added to the gluing system 10, a further controller module 15 is connected to the outermost subordinate controller 15*e* in FIG. 2 in the manner described above.

LIST OF REFERENCE SYMBOLS

10 Gluing system
11 Glue valve
12 Glue valve opening
13 Master controller
14 Data line
15 Subordinate controller
16 Power supply
17 Power line
18*a* Control line
18*b* Control line
19 Coil actuation means
20 Temperature sensor
21 Section controller
22 Signal line
23 Rotary transducer
24 Signal line
25 Signal line
26 Signal line
27 Machine controller
28*a* Current profile curve
28*b* Current profile curve
28*c* Current profile curve
29 Contact tongue

What is claimed is:

1. A method for operating a gluing system (10) for gluing blanks for producing and/or packaging cigarettes or other smokable objects, comprising:

conveying the blanks along glue valves (11) of the gluing system (10);

in order to control and/or regulate the glue valves (11), using a superordinate master controller (13) to respectively transmit values of at least one control and/or regulation parameter to individual controllers (15) which are assigned to the glue valves (11), are subordinate to the master controller (13), and are each connected to the superordinate master controller (13) via a suitable data connection, wherein the subordinate controller (15) uses said values to control and/or regulate the glue valve (11) assigned to subordinate controller (15);

recording the values of at least one characteristic variable of the glue valves (11) respectively integrated in the gluing system (10) for one of the glue valves (11), for a plurality of the glue valves (11), or for each of the glue valves (11), wherein the at least one characteristic variable is the electrical current flowing through the coil of an electromagnet of the glue valve (11) in the event of movements of a closure element of the respective glue valve (11) which have been caused by the electromagnet; and detecting and determining the corresponding glue valve and fault states of the glue valves (11) using the values of the at least one characteristic variable.

2. The method as claimed in claim 1, wherein sensors (20) respectively connected to the subordinate controllers (15) record measured values of at least one measurement variable, the subordinate controllers (15) respectively transmit these measured values to the master controller (13), and the master controller (13) determines the at least one control and/or regulation parameter values for the relevant glue valve (11) on the basis of these measured values and/or selects said parameter values from a database assigned to the master controller and then the master controller (13) transmits said parameter values to the respective subordinate controller (15).

3. The method as claimed in claim 1 or 2, wherein the at least one control and/or regulation parameter provided is the intensity and/or the duration of the electrical current applied to the electromagnet of the respective glue valve (11), which electromagnet moves the closure element of the respective glue valve (11) during operation of the gluing system (10).

4. The method as claimed in claim 2, wherein the master controller (13) determines a set of corresponding control and/or regulation parameters on the basis of the value or values of the at least one characteristic variable and/or selects said set of corresponding control and/or regulation parameters from a data memory assigned to the master controller and transmits said set of corresponding control and/or regulation parameters to the respective subordinate controller (15).

5. The method as claimed in claim 4, further comprising analyzing the value or values of the at least one characteristic variable using predefined stored desired values of the characteristic variable, in order to determine whether the corresponding glue valve (11) is faulty and/or has predefined features, and transmitting a signal representing a glue valve fault and/or a signal representing the absence of the predefined feature to a signal display means on the basis of the result.

6. A gluing system for gluing blanks for producing and/or packaging cigarettes or other smokable objects, comprising:

a plurality of glue valves (11) along which the blanks are conveyable using a conveyor;

a superordinate master controller (13) and controllers (15) to control and/or regulate the glue valves (11), wherein the controllers (15) are respectively assigned to each glue valve (11), are subordinate to the master controller (13), and are each connected to the superordinate master controller (13) via a data connection; and a detection device which is used to respectively record the values of at least one characteristic variable of the glue valves (11) respectively integrated in the gluing system (10), wherein the characteristic variable is the electrical current flowing through a coil of an electromagnet of the glue valve (11), which electromagnet is used to move a closure element of the glue valve (11), wherein values of at least one control and/or regulation parameter are transmittable to the subordinate controllers (15) from the master controller (13) via the data connection, and the respective subordinate controller (15) uses said values to control or regulate the glue valve (11) assigned to subordinate controller (15), and wherein the detection device is used to detect and determine the glue valve and fault states of the glue valve (11) using the values of the at least one characteristic variable.

7. The gluing system as claimed in claim 6, further comprising at least one sensor (20) for detecting a measurement variable, wherein the at least one sensor (20) is respectively connectable to the subordinate controllers (15), the respective glue valve (11) is controllable/regulatable on the basis of the values of the measurement variable, the at least one sensor is a sensor for detecting the glue temperature or the glue pressure or the glue viscosity, and/or the recorded measured values are transmittable to the master controller (13), which is used to determine the values of the at least one control and/or regulation parameter on the basis of the measured values.

8. The gluing system as claimed in claim 6 or 7, wherein the subordinate controllers (15) are each in the form of individual modules which are each connectable to the master controller (13) and/or to at least one further subordinate controller (15) via suitable contact-connection means.

9. The gluing system as claimed in claim 6 or 7, further comprising an additional glue valve (11), wherein, when the additional glue valve (11) is integrated in the gluing system (10), the gluing system (10) is accordingly expanded by an additional subordinate controller (15) for controlling/regulating the added glue valve (11).

10. The gluing system as claimed in claim 6 or 7, wherein the detection device is part of the master controller (13).

11. The gluing system as claimed in claim 6 or 7, wherein the electromagnet is used to move a closure element of the glue valve (11) from a closing position to an opening position.

12. The gluing system as claimed in claim 6 or 7, wherein the master controller (13) determines the set of at least one control and/or regulation parameters on the basis of the respective values of the characteristic variable and/or selects said set of at least one control and/or regulation parameters from a memory assigned to the master controller (13).

13. The gluing system as claimed in claim 9, wherein the gluing system (10) is accordingly expanded by the additional subordinate controller (15) for controlling/regulating the added glue valve (11) by virtue of the additional subordinate controller (15) being connected to another one of the subordinate controllers (15) already integrated in the system and/or to the master controller (13) via a corresponding one of the contact-connection means (29).

* * * * *